United States Patent
Burch

(10) Patent No.: US 8,409,703 B2
(45) Date of Patent: *Apr. 2, 2013

(54) TEMPERATURE SWITCHABLE ADHESIVE ASSEMBLIES WITH TEMPERATURE NON-SWITCHABLE TACK

(75) Inventor: Robert Ray Burch, Exton, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 206 days.

This patent is subject to a terminal disclaimer.

(21) Appl. No.: 12/842,068

(22) Filed: Jul. 23, 2010

(65) Prior Publication Data

US 2012/0021215 A1    Jan. 26, 2012

(51) Int. Cl.
*B32B 7/12* (2006.01)
*B32B 15/04* (2006.01)

(52) U.S. Cl. .............. 428/343; 428/354; 428/355 R

(58) Field of Classification Search .............. 428/343, 428/354, 355 R
See application file for complete search history.

(56) References Cited

U.S. PATENT DOCUMENTS

| | | | |
|---|---|---|---|
| 1,957,786 A | 5/1934 | Koch | |
| 2,179,339 A | 11/1939 | Little | |
| 3,873,643 A | 3/1975 | Wu et al. | |
| 4,421,737 A | 12/1983 | Ito et al. | |
| 4,584,188 A | 4/1986 | Graham | |
| 4,605,696 A | 8/1986 | Benko et al. | |
| 5,116,824 A | 5/1992 | Miyata et al. | |
| 5,156,911 A | 10/1992 | Stewart | |
| 5,162,430 A | 11/1992 | Rhee et al. | |
| 5,292,802 A | 3/1994 | Rhee et al. | |
| 5,308,889 A | 5/1994 | Rhee et al. | |
| 5,324,775 A | 6/1994 | Rhee et al. | |
| 5,328,995 A | 7/1994 | Schaulin et al. | |
| 5,387,450 A | 2/1995 | Stewart | |
| 5,391,375 A | 2/1995 | Hille et al. | |
| 5,412,035 A | 5/1995 | Schmitt et al. | |
| 5,505,952 A | 4/1996 | Jiang et al. | |
| 5,514,379 A | 5/1996 | Weissleder et al. | |
| 5,643,575 A | 7/1997 | Martinez et al. | |
| 5,698,620 A | 12/1997 | Wideman et al. | |
| 5,725,874 A | 3/1998 | Oda et al. | |
| 5,733,563 A | 3/1998 | Fortier | |
| 6,288,149 B1 | 9/2001 | Kroll | |
| 7,399,800 B2 * | 7/2008 | Burch | 524/274 |
| 7,899,800 B2 | 3/2011 | Fachan et al. | |
| 2006/0235149 A1 | 10/2006 | Burch | |
| 2010/0086678 A1 | 4/2010 | Arthur et al. | |

FOREIGN PATENT DOCUMENTS

| | | |
|---|---|---|
| JP | 1982-102932 | 6/1982 |
| JP | 1988-11167 | 1/1988 |
| WO | WO 91/15368 | 10/1991 |

OTHER PUBLICATIONS

Pfannemuller, B., et al., "Chemical Modification of the Surface of the Starch Granules", Starch/Starke, vol. 95, No. 9, 1983, pp. 298-303.
Burch, U.S. Appl. No. 12/771,078, filed Apr. 30, 2010.

* cited by examiner

*Primary Examiner* — Victor Chang

(57) ABSTRACT

Disclosed herein are temperature switchable adhesive assemblies, which maintain tack above and below the switching temperature. The temperature switchable adhesive assemblies comprise a backing, a first adhesive layer comprising a temperature switchable pressure sensitive adhesive disposed on the backing, and a second adhesive layer comprising a non-switchable pressure sensitive adhesive disposed on the first adhesive layer. The temperature switchable adhesive assemblies have use in medical, consumer, and industrial applications.

16 Claims, No Drawings

TEMPERATURE SWITCHABLE ADHESIVE ASSEMBLIES WITH TEMPERATURE NON-SWITCHABLE TACK

FIELD OF THE INVENTION

The invention relates to the field of pressure sensitive adhesives. More specifically, the invention relates to pressure sensitive adhesive assemblies that have temperature switchable peel strength but maintain tack above and below the switching temperature.

BACKGROUND OF THE INVENTION

Pressure sensitive adhesives (PSA) are well known and are used in many industrial, consumer and medical applications. Pressure sensitive adhesives are formulations typically comprising an elastomeric polymer, a tackifier, and optionally an oil or other additives. These adhesives remain permanently tacky and adhere instantaneously to a wide variety of surfaces with the application of a small amount of pressure. Pressure sensitive adhesives are generally used in the form of adhesive assemblies comprising a coating on a backing, such as in adhesive bandages, wound dressings, transdermal delivery devices, tapes, stencils, wall paper, envelopes, stamps, and floor tiles.

For many applications, it is desirable to be able to remove the adhesive assembly from the surface without significant force, so that the surface or substrate, for example, newly healed skin, is not damaged. For this reason, switchable adhesives, which undergo a reduction in peel strength with a change in conditions, have been developed. Switchable adhesives that exhibit a reduction in peel strength upon contact with water or exposure to UV radiation are known. Particularly useful for some adhesive applications are temperature switchable adhesives, which undergo a reduction in peel strength with a temperature change (see for example, Stewart, U.S. Pat. Nos. 5,156,911 and 5,387,450; Schmitt et al., U.S. Pat. No. 5,412,035; and Burch, U.S. Pat. No. 7,399,800).

Typically, these temperature switchable pressure sensitive adhesives have high peel strength and low tack below the switching temperature and low peel strength but high tack above the switching temperature. Some temperature switchable pressure sensitive adhesives, such as those described by Stewart et al. (U.S. Pat. Nos. 5,387,450 and 5,387,450), have low peel strength and low tack below their switching temperature and high peel strength and high tack above the switching temperature. Therefore, the temperature switchable adhesive assemblies must be either warmed or cooled in order to activate adhesion to a substrate.

In view of the above, the need exists for new temperature switchable adhesive assemblies which maintain tack above and below the switching temperature.

SUMMARY OF THE INVENTION

The stated need is addressed herein by the discovery of temperature switchable adhesive assemblies, which maintain tack above and below the switching temperature.

Accordingly, in one embodiment the invention provides a temperature switchable adhesive assembly comprising:
   a) a backing;
   b) a first adhesive layer disposed on said backing; and
   c) a second adhesive layer disposed on said first adhesive layer;
wherein said first adhesive layer comprises a temperature switchable pressure sensitive adhesive and said second adhesive layer comprises a non-switchable pressure sensitive adhesive.

In another embodiment, the invention provides a method of making a temperature switchable adhesive assembly comprising the steps of:
   a) providing a backing;
   b) applying a first adhesive layer onto said backing; and
   c) applying a second adhesive layer onto said first adhesive layer;
wherein said first adhesive layer comprises a temperature switchable pressure sensitive adhesive and said second adhesive layer comprises a non-switchable pressure sensitive adhesive.

DETAILED DESCRIPTION OF THE INVENTION

Disclosed herein are temperature switchable adhesive assemblies, which maintain tack above and below the switching temperature. The temperature switchable adhesive assemblies comprise a backing, a first adhesive layer comprising a temperature switchable pressure sensitive adhesive disposed on the backing, and a second adhesive layer comprising a non-switchable pressure sensitive adhesive disposed on the first adhesive layer.

The temperature switchable adhesive assemblies may be used for a variety of medical applications in the form of adhesive tapes, adhesive bandages, immobilization devices, wound dressings, transdermal delivery devices, EKG electrodes, and the like. Additionally, the assemblies may be used for industrial and consumer applications, such as masking tapes, stencils, envelopes, labels, stamps, wallpaper, and floor tiles.

DEFINITION OF TERMS AND ABBREVIATIONS

The following definitions are used herein and should be referred to for interpretation of the claims and the specification.

The phrase "temperature switchable pressure sensitive adhesive" refers to a pressure sensitive adhesive that exhibits temperature switchable properties.

The phrase "temperature switchable properties" as used herein refers to properties exhibited by a temperature switchable adhesive whereby the peel strength of the adhesive is reduced by at least about 50%, more particularly at least about 90%, when the temperature is changed over a range of about 10° C., more particularly a range less than 5° C.

The term "switching temperature" refers to the temperature at which a temperature switchable adhesive undergoes a sharp change in peel strength. The peel strength may be high below the switching temperature and decrease sharply above the switching temperature, or may be low below the switching temperature and increase sharply above the switching temperature.

The phrase "non-switchable pressure sensitive adhesive" refers to a pressure sensitive adhesive which does not undergo a sharp reduction in peel strength with a change in temperature.

The term "peel strength" refers to the strength of the adhesive bond of an adhesive, measured as the average load per unit width of bond line required to separate bonded materials. Standard laminates of the temperature switchable adhesives on backing and substrates used for measuring the peel strength are prepared according to ASTM Method D-3330. The 90° peel strength is measured according to IPC Test Method 650.

The term "elastomer" refers to a polymer that recovers completely and very quickly from great extensions, which can be up to 1000% or more. As used herein, elastomers include thermoplastic elastomers, which include uncrosslinked polyolefins that are elastomeric. Styrene-butadiene-styrene triblock copolymers are a notable example.

The term "tackifier" refers to a substance added to resins to improve the initial and extended tack range of the adhesive.

The term "tack" refers to the ability of a material to stick to the surface on momentary contact and then to resist separation.

The term "crystallizable oil" refers to an oil that has a crystalline melting point (CMP) that occurs at a temperature within the temperature range of the rubbery plateau of the pressure sensitive adhesive.

The term "crystalline melting point" refers to the temperature at which the crystalline or semi-crystalline phase transitions to an amorphous phase.

The term "rubbery plateau" as used herein in reference to pressure sensitive adhesives, refers to the temperature region between the glass transition temperature (T1) and the temperature at which the material flows as a low viscosity liquid (T2) wherein the stiffness of the pressure sensitive adhesive remains relatively constant. A detailed discussion of the rubbery plateau can be found in standard polymer science textbooks, such as *The Elements of Polymer Science and Engineering*, A. Rudin, Academic Press, NY, 1982, page 395.

The term "substrate" refers to any surface to which application of the temperature switchable adhesive assembly is desired.

The meaning of abbreviations used is as follows: "min" means minute(s), "h" means hour(s), "sec" means second(s), "mL" means milliliter(s), "µL" means microliter(s), "cm" means centimeter(s), "mm" means millimeter(s), "µm" means micrometer(s), "mils" means thousandths of an inch, "g" means gram(s), "mg" means milligram(s), "kg" means kilogram(s), "mmol" means millimole(s), "lb" means pound (s), "wt %" means percent by weight, "PVC" means poly (vinyl chloride), and "nd" means not determined.

First Adhesive Layer

The first adhesive layer comprises a temperature switchable pressure sensitive adhesive. Any suitable temperature switchable pressure sensitive adhesive known in the art may be used. For example, the temperature switchable pressure sensitive adhesive may be a pressure sensitive adhesive containing a crystalline polymeric additive, as described by Schmitt et al. (U.S. Pat. No. 5,412,035). The crystalline polymeric additive has a weight-average molecular weight of less than 25,000 and a melting point greater than 23° C. The crystalline polymeric additive may be a side chain crystallizable polymer, including but not limited to, polymers of one or more monomers such as substituted or unsubstituted acrylates, fluoroacrylates, vinyl esters, acrylamides, maleimides, α-olefins, p-alkyl styrenes, alkylvinyl ethers, alkylethylene oxides, triglycerides, alkyl phosphazenes and amino acids; polyisocyanates, polyurethanes, and polysiloxanes. Suitable base resins of the pressure sensitive adhesive include, but are not limited to polyacrylate or styrene/butadiene copolymers.

The temperature switchable pressure sensitive adhesive may also be a pressure sensitive adhesive comprising an elastomer and a crystallizable abietic acid derivative as tackifier, as described by Burch (U.S. Pat. No. 7,399,800). The abietic acid derivatives are derivatives of abietic acid, or related resin acids, including but not limited to, neoabietic acid, palustric acid, dehydroabietic acid, pimaric acid, and isopimaric acid. Suitable crystallizable abietic acid derivatives contain a crystallizable group, including but not limited to, a linear or branched, substituted or unsubstituted alkyl or trans alkenyl group having from 12 to 30 carbon atoms, a fluoroalkyl or trans fluoroalkenyl group having from 12 to 30 carbon atoms, phenyl, benzyl, phenolic, naphthalenic, or hydroquinoid. In one embodiment, the crystallizable abietic acid derivative is hexadecyl ester of abietic acid (i.e., cetyl abietate). Suitable elastomers include, but are not limited to, thermoplastic rubbers, natural rubbers, butyl rubbers, polyisobutylene polymers, vinyl ether polymers, ethylene/acrylic copolymers, and silicone-based rubbers.

The temperature switchable pressure sensitive adhesive may also be a pressure sensitive adhesive comprising an elastomer and a crystallizable pinene-based tackifier, as described by Burch (U.S. Patent Application Publication No. 2006/0235149). The crystallizable pinene-based tackifiers are copolymers comprising at least one pinene monomer including, but not limited to, β-pinene and α-pinene oxide, and at least one comonomer that is capable of cationically polymerizing with the pinene monomer and has at least one crystallizable group. A mixture of pinene monomers and comonomers may also be used. Suitable comonomers include vinyl ethers, alkoxy styrenes, cyclopentadienes, and dicyclopentadienes having at least one crystallizable group. Exemplary crystallizable groups include, but are not limited to, linear or branched, substituted or unsubstituted alkyl or trans alkenyl groups having from 12 to 30 carbon atoms, fluoroalkyl or trans fluoroalkenyl groups having from 12 to 30 carbon atoms, phenyl, benzyl and naphthalenyl. Suitable elastomers include, but are not limited to, thermoplastic rubbers, natural rubbers, butyl rubbers, polyisobutylene polymers, vinyl ether polymers, ethylene/acrylic copolymers, and silicone-based rubbers.

Additionally, the temperature switchable pressure sensitive adhesive may comprise at least one pressure sensitive adhesive which does not exhibit temperature switchable properties and at least one crystallizable oil, as described by Burch (U.S. patent application Ser. No. 12/771,078). Suitable non-switchable pressure sensitive adhesives are described below under the description of the second adhesive layer. Suitable crystallizable oils are oils that have a crystalline melting point (CMP) that occurs at a temperature within the temperature range of the rubbery plateau region of the pressure sensitive adhesive being used, specifically between the glass transition temperature (T1) and the temperature at which the material flows as a low viscosity liquid (T2). Therefore, the choice of a suitable crystallizable oil depends on the pressure sensitive adhesive of interest. The temperature range of the rubbery plateau region of the pressure sensitive adhesive may be found in the literature or may be determined experimentally using methods known in the art (e.g., thermomechanical analysis). Then, oils that have a crystalline melting point within the rubbery plateau region of the pressure sensitive adhesive of interest may be found in the literature (e.g., *The Handbook of Chemistry and Physics*, CRC Press, Boca Raton, Fla.). The switching temperature of the adhesive may be controlled by selecting crystallizable oils having different crystalline melting temperatures within the rubbery plateau. In general, a crystallizable oil having a crystalline melting point close to the desired switching temperature is used. Suitable crystallizable oils are branched or unbranched oils that have a crystalline melting point, and include, but are not limited to, hexadecane (CMP about 18° C.), 1-hexadecanol (CMP about 48-50° C.), 1-tetradecane (CMP about 6° C.), 1-tetradecanol (CMP about 35-39° C.), octadecane (CMP about 26-29° C.), and octadecanol (CMP of about 56-59° C.). These oils are particularly useful in combination with polystyrene-block-polyisoprene-block-polystyrene (rubbery plateau from T1 about −70° C. to T2 about 95° C.) based pressure sensitive adhesives. The crystallizable oil is used at a concentration of at least about 20%, more particularly, at least about 25% by weight relative to the total weight of the adhesive composition. In one embodiment, the first adhesive layer comprises a styrene-isoprene-styrene triblock copolymer which has a styrene content of about 14% to about 22% by weight, abietic acid as tackifier, and 1-hexadecanol as crystallizable oil. In another embodiment, the first adhesive layer comprises a styrene-isoprene-styrene triblock copolymer which has a styrene content of about 14% to about 22% by weight, poly-β-pinene as tackifier, and 1-hexadecanol as crystallizable oil.

All of the aforementioned temperature switchable pressure sensitive adhesives lose adhesive strength when heated to a temperature above the switching temperature. Additionally, a temperature switchable pressure sensitive adhesive that loses adhesive strength upon cooling, such as those described by Stewart et al. (U.S. Pat. Nos. 5,156,911 and 5,387,450), may be used. Those temperature switchable pressure sensitive adhesives comprise a side-chain crystallizable polymer having a heat of fusion greater than 20 Joules/g and a melting point or first order transition temperature in the range of about 20° C. to 35° C. The backbone of the polymer may be any organic structure (aliphatic or aromatic hydrocarbon, ester, ether, amide, etc.) or an inorganic structure (sulfide, phosphazine, silicone, etc.), and may include spacer linkages which can be any suitable organic or inorganic unit, for example ester, amide, hydrocarbon, phenyl, ether, or ionic salt (e.g., a carboxyl-alkyl ammonium or sulphonium or phosphonium ion pair or other known ionic salt pair). The side-chain may be aliphatic or aromatic or a combination of aliphatic and aromatic, and is capable of entering into a crystalline state. Common examples are: linear aliphatic side-chains of at least 10 carbon atoms, e.g., $C_{14}$-$C_{22}$ acrylates or methacrylates, acrylamides or methacrylamides, vinyl ethers or esters, siloxanes or alpha olefins; fluorinated aliphatic side-chains of at least 6 carbons; and p-alkyl styrene side-chains wherein the alkyl is of 8 to 24 carbon atoms.

Second Adhesive Layer

The second adhesive layer comprises a non-switchable pressure sensitive adhesive. Any suitable non-switchable pressure sensitive adhesive known in the art may be used. Typically, a pressure sensitive adhesive comprises a base polymer, a tackifier, and optionally other additives. Additionally, there are pressure sensitive adhesives that do not require the use of a tackifier because the base polymer used is self-tackifying. Examples of these self-tackifying pressure sensitive adhesives include, but are not limited to, acrylics.

In one embodiment, a non-switchable pressure sensitive adhesive comprising at least one elastomer as the base polymer and at least one tackifier is used. Any suitable elastomer known in the pressure sensitive adhesive art may be useful, including, but not limited to, thermoplastic rubbers, natural rubbers, butyl rubbers, polyisobutylene polymers, vinyl ether polymers, ethylene/acrylic copolymers, and silicone-based rubbers. In one embodiment, the elastomer is a thermoplastic rubber of the ABA block copolymer type, wherein A is a thermoplastic polystyrene end-block and B is a rubber midblock, selected from polyisoprene, polybutadiene, and poly (ethylene/butylene). Typically, the elastomer has a thermoplastic polystyrene end-block content of about 14% to about 30% by weight of the block copolymer. Suitable elastomers are available from commercial sources, such as Sigma-Aldrich, and the Dow Chemical Co. (Midland, Mich.).

In one embodiment, the elastomer is a styrene-isoprene-styrene triblock copolymer which has a styrene content of about 14% to about 22% by weight. In another embodiment, the elastomer is a styrene-isoprene-styrene triblock copolymer which has a styrene content of about 22% by weight.

The tackifier used may be any suitable tackifier known in the art. Exemplary tackifiers include, but are not limited to, poly-β-pinene, abietic acid, abietic acid esters, hydrogenated abietic acid and its esters, poly-α-pinene, neoabietic acid, palustric acid, dihydroabietic acid, dehydroabietic acid, pimaric acid, isopimaric acid, styrene-based tackifiers such as styrene, methyl styrene, indene, and methyl indene; and tackifiers based on oligomers of diclyopentadienes and oligomers of butadienes. In one embodiment, the tackifier is poly-β-pinene (CAS No. 70750-58-2) or abietic acid (CAS No. 514-10-3). Typically, the tackifier and base polymer are combined in weight ratios of about 0.8:1 to about 3.0:1, and more particularly, from about 1:1 to about 2:1, respectively.

In one embodiment, the second adhesive layer comprises a styrene-isoprene-styrene triblock copolymer which has a styrene content of about 14% to about 22% by weight and abietic acid as tackifier.

In another embodiment, the second adhesive layer comprises a styrene-isoprene-styrene triblock copolymer which has a styrene content of about 14% to about 22% by weight and poly-β-pinene as tackifier.

Temperature Switchable Adhesive Assemblies

The temperature switchable adhesive assemblies disclosed herein comprise a backing, a first adhesive layer, and a second adhesive layer, as described above. The first adhesive layer is disposed on the backing and the second adhesive layer is disposed on the first adhesive layer. Any appropriate backing may be used, including, but not limited to, tapes, films of synthetic polymers, films of natural polymers, sheets of synthetic polymers, sheets of natural polymers, woven fabrics, nonwoven fabrics, and paper products, such as labels, paper tapes, envelopes, stamps, and cardboard. The backing should maintain structural integrity at the temperature of application to the desired surface and at the temperature required to release the assembly from the surface.

The first adhesive layer may be applied onto the backing in various ways, including, but not limited to, spraying, painting, dipping, gravure printing, rolling, laminating, and the like. The first adhesive layer may also be applied by transfer from a release sheet. For example, coating technologies widely practiced in the pressure sensitive adhesive art may be employed for laminating these temperature switchable adhesives to backings and release paper (see for example, *Handbook of Pressure-Sensitive Adhesive Technology*, D. Satas, ed, Van Nostrand Reinhold, New York, N.Y., 1982). These coating technologies include, but are not limited to, knife-over-roll, trailing blade, wire-wound rod, air doctor, reverse roll, gravure roll, and slot orifice. The adhesive composition may be applied neat, or in a suitable solvent, or as an emulsion or a latex. The second adhesive layer may be applied onto the first adhesive layer using these same methods.

The thickness of the adhesive layers will vary depending on the intended application. Typically, the thickness of the adhesive layers is about 0.16 mils (0.004 mm) to about 30 mils (0.76 mm). The appropriate adhesive layer thicknesses for any particular application may be readily determined using routine experimentation by one skilled in the art.

The temperature switchable adhesive assemblies may be used for a variety of medical applications in the form of adhesive tapes, adhesive bandages, immobilization devices, wound dressings, transdermal delivery devices, EKG electrodes, and the like. Additionally, the assemblies may be used for industrial and consumer applications, such as masking tapes, stencils, envelopes, labels, stamps, wallpaper, and floor tiles.

The temperature switchable adhesive assembly can be attached to the desired substrate by applying it to the surface with a small amount of pressure. Because the temperature switchable adhesive assemblies disclosed herein maintain tack above and below the switching temperature, the assembly does not need to be heated or cooled in order to activate adhesion to a substrate. The assembly is left in place for as long as desired and then is removed by either heating the assembly to a temperature above the switching temperature for a temperature switchable adhesive that loses adhesive strength above the switching temperature, or cooling the assembly to a temperature below the switching temperature for a temperature switchable adhesive that loses adhesive strength below the switching temperature. Heating may be accomplished using any suitable means depending on the application. For example, a warm compress, a chemical heat pack, a heating pad, or warm water may be used for medical applications, while a hair dryer, a hot air gun, an oven, a warming chamber, or ambient heat may be used for industrial and consumer applications. Cooling may be done by application of ice, a cold pack, cold water, or the like.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and can make various changes and modifications of the invention to adapt it to various uses and conditions.

Reagents and Solvents:

The triblock copolymer, polystyrene-block-polyisoprene-block-polystyrene, referred to hereafter as "PSIS", (CAS No. 25038-32-8, 22 wt % styrene, melt index 3 g/10 min, viscosity 12 poise (25 wt % in toluene, 25° C., Brookfield)), poly-β-pinene, abietic acid, and 1-hexadecanol were obtained from Sigma-Aldrich (St. Louis, Mo.). Solvents were distilled according to standard solvent purification procedures.

Examples 1-4

Two-Layer Temperature Switchable Adhesive Assemblies that Maintain Tack Above and Below the Switching Temperature These Examples demonstrate temperature switchable adhesive assemblies that maintain tack above and below the switching temperature. The assemblies were comprised of two layers on a backing. The first layer (i.e., the layer closest to the backing) was a temperature switchable pressure sensitive adhesive and the second layer was a conventional non-switchable pressure sensitive adhesive.

The temperature switchable adhesive layers were prepared using a combination of PSIS, abietic acid or poly-β-pinene as tackifier, and 1-hexadecanol (1-HDA) as a crystallizable oil additive, as indicated in Table 1. The components were dissolved in toluene/tetrahydrofuran (THF) in a 1:1:1 weight ratio at approximately 20% solids as follows. The PSIS was a 25 wt % solution in toluene, the poly-β-pinene was a 50 wt % solution in toluene, and the 1-HDA was a 37.5 wt % solution in THF. These solutions were combined to give the desired ratios. The resulting solutions were cast to a thickness of 30 mils (0.76 mm) using a doctors blade onto siliconized release paper that was mounted on a glass plate. The solution-cast films were then dried for 30 min in a vacuum oven at 70° C. A PVC backing was then applied to the adhesives at 70° C. and was smoothed out with a wall paper seam roller, which readily transferred the film to the PVC backing. The release paper was peeled off the adhesive after cooling to room temperature.

The conventional pressure sensitive adhesive layers were prepared as described above using the same components as the temperature switchable layers, but without the crystallizable oil. This second layer was applied on top of the first layer at 70° C. as described above. The resulting two-layer adhesive assemblies were stored with a release paper covering until they were ready for use. The two layers were made with different thicknesses, as given in Table 1.

The two-layer adhesive assemblies were laminated onto a PVC-faced cloth substrate (96.5 µm thickness), textured to be a leather look-alike (obtained from a local fabric store), at 34° C. according to ASTM Method D-3330. For creating the adhesive bonds by the ASTM procedure, an aluminum metal plate was used which was heated by a hotplate. The temperature of the metal plate was maintained by manual temperature adjustment using a thermocouple to monitor the temperature. This is referred to as the "set temperature". A 2.5 lb (1.13 kg) metal wallpaper seam roller, attached to an Instron® device with a cross-head speed of 12 in/min (30.5 cm/min), was used to laminate the bond by rolling it back and forth across the sample. The resulting laminate was allowed to cool to room temperature.

Measurement of Peel Strength

The two-layer adhesive laminate samples were maintained at the set temperature in a temperature-controlled oven until the samples were ready for measuring the temperature dependence of the 90° peel strength. The peel strength measurements were done according to IPC Test Method 650, using an Instron® device equipped with a temperature-controlled oven and a metal wheel. The sample was mounted on the wheel using double-faced Kapton® adhesive tape on the edge of the roller and metal adhesive tape to hold down the ends. The test specimen sizes were typically 1 inch×3 inch (2.5 cm×7.6 cm) or 0.5 inch×3 inch (1.3 cm×7.6 cm). The clamps on the Instron® device were attached to the free end of the backing material. The samples were temperature equilibrated at the desired temperature for 2 min before testing. The samples were pulled at 6 inch/min (15.2 cm/min), and the data was recorded and processed using MTS Test Works 4 system, purchased from the MTS Systems Corp. (Eden Prairie, Minn.) for software test control and data acquisition. Load and displacement were captured through an analog to digital card and the average calculated by integration through selected points on the curve. The peel strength as a function of temperature was then determined, allowing a 2 minute equilibration time for the samples at each temperature. The peel strengths at different temperatures, given as the average of two determinations, are shown in Table 1.

Measurement of Tack

The tack of the two-layer adhesive assemblies was measured against the PVC surrogate substrate according to a procedure that was based on ASTM D 6195 Standard Test Methods for Loop Tack, Method A (using a Tensile Tester). A 1 inch (2.5 cm) wide×7 inch (17.8 cm) long specimen strip was gripped at its ends forming a loop. The ends were covered with 1 inch (2.5 cm) wide masking tape and gripped in an air grip. The test machine was programmed to cycle from 4 inches (10.2 cm) above the 1 inch square contact face to 1 inch above the face, then reverse back to the start. The tear drop loop formed by gripping the two ends of the sample contacted the face and laid flat on it, and then was pulled off. This method was modified by backing the tape with foil tape to increase contact pressure and make the measured strengths higher than the noise of the test unit. The tack values obtained are given in Table 1.

TABLE 1

Peel Strength and Tack as a Function of Temperature

| Example | Composition | Switchable Layer Thickness (μm) | Non-Switchable Layer Thickness (μm) | Temp (° C.) | Peel Strength (g/mm) | Tack (g) |
|---|---|---|---|---|---|---|
| 1 | PSIS/Abietic Acid/1-HDA (1:1:1, switchable layer) & PSIS/Abietic Acid (1:1, non-switchable layer) | 420 | 51 | 23 | nd | 10.73 |
|  |  |  |  | 30 | 4.9 | nd |
|  |  |  |  | 35 | 7.3 | nd |
|  |  |  |  | 40 | 3.6 | nd |
|  |  |  |  | 45 | 4.5 | nd |
|  |  |  |  | 50 | 0.90 | 20.27 |
|  |  |  |  | 55 | 1.1 | nd |
| 2 | PSIS/Poly-β-Pinene/1-HDA (1:1:1, switchable layer) & PSIS/Poly-β-Pinene (1:1, non-switchable layer) | 420 | 255 | 23 | nd | 21.19 |
|  |  |  |  | 30 | 5.4 | nd |
|  |  |  |  | 35 | 11.7 | nd |
|  |  |  |  | 40 | 6.7 | nd |
|  |  |  |  | 45 | 3.0 | nd |
|  |  |  |  | 50 | 2.3 | 65.24 |
|  |  |  |  | 55 | 2.7 | nd |
| 3 | PSIS/Poly-β-Pinene/1-HDA (1:1:1, switchable layer) & PSIS/Poly-β-Pinene (1:1, non-switchable layer) | 440 | 4.3 | 23 | nd | 65.29 |
|  |  |  |  | 30 | 22.5 | nd |
|  |  |  |  | 35 | 19.6 | nd |
|  |  |  |  | 40 | 25.6 | nd |
|  |  |  |  | 45 | 11.7 | nd |
|  |  |  |  | 50 | 3.8 | 157.8 |
|  |  |  |  | 55 | 5.7 | nd |
| 4 | PSIS/Poly-β-Pinene/1-HDA(1:1:1, switchable layer) & PSIS/Poly-β-Pinene (1:1, non-switchable layer) | 440 | 211 | 23 | nd | 110.7 |
|  |  |  |  | 30 | nd | nd |
|  |  |  |  | 35 | nd | nd |
|  |  |  |  | 40 | nd | nd |
|  |  |  |  | 45 | nd | nd |
|  |  |  |  | 50 | nd | 162.2 |
|  |  |  |  | 55 | nd | nd |

As can be seen from the results in Table 1, the two-layer temperature switchable adhesive assemblies exhibited a sharp drop in peel strength between temperatures of about 40 to 50° C., and they all had significant tack above and below the switching temperature. In contrast, a single layer, temperature switchable pressure sensitive adhesive comprising PSIS and the hexadecyl ester of abietic acid as tackifier exhibited tack that increased as the temperature was raised above the switching temperature (Burch, U.S. Pat. No. 7,399,800, Example 2).

5 COMPARATIVE

Non-Switchable Pressure Sensitive Adhesive

This Example demonstrates that a pressure sensitive adhesive comprising PSIS and poly-β-pinene tackifier has neither temperature switchable peel strength nor tack.

An adhesive film of PSIS blended in a 1:3 weight ratio with poly-β-pinene was prepared according to the procedure described in Examples 1-4. The resulting adhesive film was laminated onto the PVC leather-like surrogate substrate at 65° C. according to the ASTM procedure. The adhesive thickness was 10.73±4.34 mils (0.272±0.110 mm). The peel strength and tack as a function of temperature were then determined as described in Examples 1-4, allowing two minutes equilibration time for the samples at each temperature. The results, presented as the average of two determinations, are shown in Table 2.

TABLE 2

Peel Strength and Tack of a Pressure Sensitive Adhesive as a Function of Temperature

| Temperature (° C.) | Peel Strength (g/mm) | Tack (g) |
|---|---|---|
| 18 | 27.19 | 0.940 |
| 23 | 40.35 | 0.419 |
| 27 | 52.38 | 0.960 |
| 31 | 98.43 | 1.812 |
| 37 | 76.22 | 0.414 |
| 45 | 35.32 | 0.549 |

The results in Table 2 show that the peel strength and tack of the pressure sensitive adhesive do not show a sharp change with temperature.

Example 6

Temperature Dependence of a Two-Layer Temperature Switchable Adhesive Assembly to Pigskin This Example demonstrates a two-layer temperature switchable adhesive assembly that maintains tack above and below the switching temperature. The assembly was comprised of two layers on a backing. The first layer (i.e., the layer closest to the backing) was a temperature switchable pressure sensitive adhesive consisting of PSIS, poly-β-pinene, and 1-hexadecanol, and the second layer was a conventional non-switchable pressure sensitive adhesive consisting of PSIS and poly-β-pinene.

To prepare the temperature switchable adhesive layer, 30 g of a 25 wt % solution of PSIS in toluene was mixed with 15 g of a 50 wt % solution of poly-β-pinene in toluene and 20 g of a 37.5 wt % solution of 1-hexadecanol in THF in a mill jar for 30 min to give a solution of 1:1:1 weight ratio of its solutes, with an overall concentration of 34.6 wt %. This solution was cast onto siliconized release paper using a doctors blade at 50 mil (1.3 mm), and dried at 70° C. in a vacuum oven for 20 min. The resulting adhesive layer was transferred while hot to a PVC backing, as described in Examples 1-4. Likewise to prepare the non-switchable adhesive layer, a 1:1 weight ratio solution of PSIS and poly-β-pinene was prepared by mixing 20 g of a 25 wt % solution of PSIS in toluene with 10 g of a 50 wt % solution of poly-β-pinene in toluene, giving an overall concentration of 33 wt %. The non-switchable layer was then cast onto release paper, and dried in a vacuum oven for 20 min. The resulting non-switchable adhesive layer was then transferred on top of the switchable layer while hot. The result was a two layer adhesive assembly; the first adhesive layer, i.e., the layer on the backing, was a switchable adhesive comprising PSIS/poly-β-pinene/1-hexadecanol in weight ratios of 1:1:1 (thickness of 17.3 mils, 0.439 mm), and the second adhesive layer was PSIS/poly-β-pinene (thickness of 8.3 mils, 0.211 mm) in 1:1 weight ratio. The two-layer adhesive assembly was laminated on freshly prepared pigskin at 23° C. The temperature dependence of peel strength was measured as described in Examples 1-4 and the results are summarized Table 3.

TABLE 3

Temperature Dependence of Peel Strength

| Set Temperature (° C.) | Read Temperature (° C.) | Peel Strength (g/mm) | Peel Strength Standard Deviation (g/mm) |
|---|---|---|---|
| 34 | 23 | 32.67 | 8.52 |
| 23 | 30 | 25.63 | 3.04 |
| 23 | 35 | 31.20 | 6.16 |
| 23 | 40 | 9.58 | 4.53 |
| 23 | 45 | 8.34 | 2.29 |
| 23 | 50 | 11.72 | 2.13 |
| 23 | 55 | 6.86 | 0.47 |

The results in Table 3 show that good peel strength was obtained with a set temperature below the switching temperature, indicating that the tack of the two layer temperature switchable adhesive assembly was temperature non-switchable.

Examples 7 and 8

Switchable Adhesive Assemblies that Maintain Tack Above and Below the Switching Temperature—Effect of using a Switchable Layer with No Tackifier These Examples demonstrate two-layer temperature switchable adhesive assemblies that maintain tack above and below the switching temperature. The adhesive assemblies were comprised of two layers on a backing. The first layer (i.e., the layer closest to the backing) was a temperature switchable pressure sensitive adhesive consisting of PSIS and 1-hexadecanol (no tackifier was used), and the second layer was a conventional non-switchable pressure sensitive adhesive consisting of PSIS and poly-β-pinene.

Two-layer adhesive assemblies were prepared by the procedure described in Examples 1-4. The non-switchable layer was a 1:1 weight ratio of PSIS and poly-β-pinene. One set of two-layer adhesives (Example 7) was cast such that the overlayer of non-switchable adhesive had a nominal thickness of 1.7 mils (0.043 mm), and the second set of two layer adhesives (Example 8) was cast such that the overlayer of non-switchable adhesives had a nominal thickness of 8.3 mils (0.21 mm). The temperature switchable layer was a 1:1 weight ratio of PSIS and 1-hexadecanol, with no tackifier, and a nominal thickness of 15 mils (0.38 mm). These two-layer adhesives were laminated on a PVC film backing and covered with a siliconized release paper, as described in Examples 1-4. For peel testing, the siliconized release paper was removed, and the resulting adhesive assembly was laminated onto a PVC based, leather-like substrate according to the ASTM procedure, at 23° C. The peel strength was measured as a function of temperature as described in Examples 1-4. The results are given in Table 4.

TABLE 4

Temperature Dependence of Peel Strength

| Example | Set Temperature (° C.) | Read Temperature (° C.) | Thickness temp switchable/non-switchable | Peel Strength (g/mm) | Peel Strength Standard Deviation (g/mm) |
|---|---|---|---|---|---|
| 7 | 34 | 30 | 15 mils/1.7 mils | 14.84 | 2.42 |
|   | 34 | 30 | 15 mils/1.7 mils | 14.62 | 5.37 |
|   | 34 | 35 | 15 mils/1.7 mils | 11.80 | 2.61 |
|   | 34 | 35 | 15 mils/1.7 mils | 12.80 | 2.38 |
|   | 34 | 40 | 15 mils/1.7 mils | 8.00 | 2.22 |
|   | 34 | 40 | 15 mils/1.7 mils | 8.50 | 2.74 |
|   | 34 | 45 | 15 mils/1.7 mils | 10.33 | 2.11 |
|   | 34 | 45 | 15 mils/1.7 mils | 9.42 | 3.29 |
|   | 34 | 50 | 15 mils/1.7 mils | 5.53 | 1.56 |
|   | 34 | 50 | 15 mils/1.7 mils | 2.85 | 0.97 |
|   | 34 | 55 | 15 mils/1.7 mils | 3.31 | 0.68 |
|   | 34 | 55 | 15 mils/1.7 mils | 3.35 | 0.79 |
| 8 | 34 | 30 | 15 mils/8.3 mils | 49.60 | 8.66 |
|   | 34 | 30 | 15 mils/8.3 mils | 33.78 | 5.41 |
|   | 34 | 35 | 15 mils/8.3 mils | 44.39 | 12.57 |
|   | 34 | 35 | 15 mils/8.3 mils | 33.12 | 7.97 |
|   | 34 | 40 | 15 mils/8.3 mils | 23.16 | 9.49 |
|   | 34 | 40 | 15 mils/8.3 mils | 29.14 | 12.98 |
|   | 34 | 45 | 15 mils/8.3 mils | 32.09 | 9.08 |
|   | 34 | 45 | 15 mils/8.3 mils | 23.65 | 3.53 |
|   | 34 | 50 | 15 mils/8.3 mils | 17.33 | 2.02 |
|   | 34 | 50 | 15 mils/8.3 mils | 16.84 | 1.56 |
|   | 34 | 55 | 15 mils/8.3 mils | 7.30 | 0.81 |
|   | 34 | 55 | 15 mils/8.3 mils | 11.51 | 2.15 |

The results in Table 4 show that good peel strength was obtained with a set temperature below the switching temperature, indicating that the tack is temperature non-switchable.

What is claimed is:

1. A temperature switchable adhesive assembly comprising:
   a) a backing;
   b) a first adhesive layer disposed on said backing; and
   c) a second adhesive layer disposed on said first adhesive layer;
   wherein (i) said first adhesive layer comprises a temperature switchable pressure sensitive adhesive and said second adhesive layer comprises a non-switchable pressure sensitive adhesive; (ii) said temperature switchable adhesive assembly has a peel strength that is reduced by at least about 50% when the temperature is changed over a range less than 5° C.; (iii) the first adhesive layer and the second adhesive layer have a thickness of about 0.004 mm to about 0.76 mm and (iv) the ratio of the thickness of the first adhesive layer to the thickness of the second adhesive layer is about 1.6 to about 102.

2. The temperature switchable adhesive assembly according to claim 1 wherein the backing is selected from the group consisting of: tapes, films of synthetic polymers, films of natural polymers, sheets of synthetic polymers, sheets of natural polymers, woven fabrics, nonwoven fabrics, and paper products.

3. The temperature switchable adhesive assembly according to claim 1 wherein the assembly has a form selected from the group consisting of adhesive tapes, adhesive bandages, immobilization devices, wound dressings, transdermal delivery devices, EKG electrodes, masking tapes, stencils, envelopes, labels, stamps, wall paper, and floor tiles.

4. The temperature switchable adhesive assembly according to claim 1 wherein the non-switchable pressure sensitive adhesive comprises at least one elastomer in combination with at least one tackifier.

5. The temperature switchable adhesive assembly according to claim 4 wherein the elastomer is an ABA block copolymer, wherein
   a) A is a thermoplastic polystyrene end-block; and
   b) B is a rubber mid-block selected from the group consisting of polyisoprene, polybutadiene, and poly(ethylene/butylene);
   wherein the elastomer has a thermoplastic polystyrene end-block content of about 14% to about 30% by weight of the block copolymer.

6. The temperature switchable adhesive assembly according to claim 4 wherein the tackifier is selected from the group consisting of poly-β-pinene, abietic acid, abietic acid esters, hydrogenated abietic acid, hydrogenated abietic acid esters, poly-α-pinene, neoabietic acid, palustric acid, dihydroabietic acid, dehydroabietic acid, pimaric acid, isopimaric acid, styrene, methyl styrene, indene, methyl indene, oligomers of diclyopentadienes, and oligomers of butadienes.

7. The temperature switchable adhesive assembly according to claim 6 wherein the tackifier is poly-β-pinene or abietic acid.

8. The temperature switchable adhesive assembly according to claim 1 wherein the temperature switchable pressure sensitive adhesive is a composition comprising:
   a) at least one pressure sensitive adhesive, which does not exhibit temperature switchable properties, having a rubbery plateau between a first temperature T1 and a second temperature T2; and
   b) at least one oil having a crystalline melting point between T1 and T2 in an amount of at least about 20% by weight of the composition.

9. The temperature switchable adhesive assembly according to claim 8 wherein the pressure sensitive adhesive comprises at least one elastomer in combination with at least one tackifier.

10. The temperature switchable adhesive assembly according to claim 9 wherein the elastomer is an ABA block copolymer, wherein
    a) A is a thermoplastic polystyrene end-block; and
    b) B is a rubber mid-block selected from the group consisting of polyisoprene, polybutadiene, and poly(ethylene/butylene);
    wherein the elastomer has a thermoplastic polystyrene end-block content of about 14% to about 30% by weight of the block copolymer.

11. The temperature switchable adhesive assembly according to claim 9 wherein the tackifier is selected from the group consisting of poly-β-pinene, abietic acid, abietic acid esters, hydrogenated abietic acid, hydrogenated abietic acid esters, poly-α-pinene, neoabietic acid, palustric acid, dihydroabietic acid, dehydroabietic acid, pimaric acid, isopimaric acid, styrene, methyl styrene, indene, methyl indene, oligomers of diclyopentadienes, and oligomers of butadienes.

12. The temperature switchable adhesive assembly according to claim 11 wherein the tackifier is poly-β-pinene or abietic acid.

13. The temperature switchable adhesive assembly according to claim 8 wherein the oil is selected from the group consisting of: hexadecane, 1-hexadecanol, 1-tetradecane, 1-tetradecanol, octadecane, and octadecanol.

14. The temperature switchable adhesive assembly according to claim 1 wherein the temperature switchable pressure sensitive adhesive comprises an elastomer and a crystallizable abietic acid derivative as tackifier.

15. The temperature switchable adhesive assembly according to claim 1 wherein the temperature switchable pressure sensitive adhesive comprises an elastomer and a crystallizable pinene-based tackifier.

16. A method of making a temperature switchable adhesive assembly comprising the steps of:
    a) providing a backing;
    b) applying a first adhesive layer onto said backing; and
    c) applying a second adhesive layer onto said first adhesive layer;
    wherein (i) said first adhesive layer comprises a temperature switchable pressure sensitive adhesive and said second adhesive layer comprises a non-switchable pressure sensitive adhesive; (ii) said temperature switchable adhesive assembly has a peel strength that is reduced by at least about 50% when the temperature is changed over a range less than 5° C.; (iii) the first adhesive layer and the second adhesive layer have a thickness of about 0.004 mm to about 0.76 mm and (iv) the ratio of the thickness of the first adhesive layer to the thickness of the second adhesive layer is about 1.6 to about 102.

* * * * *